(12) United States Patent
Hino

(10) Patent No.: US 7,454,093 B2
(45) Date of Patent: Nov. 18, 2008

(54) OPTICAL MODULE AND METHOD OF MAKING THE SAME AND METHOD OF ADJUSTING ROTATION ANGLE OF OPTICAL FIBER

(75) Inventor: Yoshinori Hino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 11/785,895

(22) Filed: Apr. 20, 2007

(65) Prior Publication Data
US 2008/0166084 A1    Jul. 10, 2008

(30) Foreign Application Priority Data
Oct. 27, 2006    (JP) ............... 2006-292538

(51) Int. Cl.
*G02B 6/00* (2006.01)
(52) U.S. Cl. ........................... 385/11; 385/52
(58) Field of Classification Search ............ 385/11, 385/52, 88, 90–92; 356/73.1
See application file for complete search history.

(56) References Cited

U.S. PATENT DOCUMENTS
4,673,244 A * 6/1987 Miles ..................... 385/38

FOREIGN PATENT DOCUMENTS
JP    06317498 A * 11/1994
JP    3403778       2/2003

* cited by examiner

*Primary Examiner*—Sarah Song
(74) *Attorney, Agent, or Firm*—Staas & Halsey LLP (57) ABSTRACT

A polarization-maintaining optical fiber takes the attitude of the rotation angle position establishing the maximum extinction ratio in a condition where the polarization-maintaining optical fiber receives no load. Under this situation, the first characteristic curve is derived to present the values of the extinction ratio for various relative rotation angles between the light source and the polarization-maintaining optical fiber establishing the maximum extinction ratio in response to the application of load. The second characteristic curve is likewise derived to present the values of the extinction ratio for various relative rotation angles between the light source and the polarization-maintaining optical fiber establishing the minimum extinction ratio in response to the application of load. The predetermined rotation angle position is thus defined based on the intersection point between the first and second characteristic curves. The extinction ratio needs not be measured for a large number of values of the load.

7 Claims, 10 Drawing Sheets

OPTICAL MODULE AND METHOD OF MAKING THE SAME AND METHOD OF ADJUSTING ROTATION ANGLE OF OPTICAL FIBER

CROSS REFERENCE TO RELATED APPLICATION

The present application is based on Japanese Priority Patent Application No. 2006-292538, filed Oct. 27, 2006, the entire contents of which are hereby incorporated by reference.

BACKGROUND OF THE INVENTION

1. Field of the Invention

The present invention relates to an optical module such as a laser diode (LD) module, for example. In particular, the invention relates to a method of adjusting the rotation angle of a polarization-maintaining optical fiber relative to a light source.

2. Description of the Prior Art

Examples of an optical module include a laser diode module provided with a laser diode, for example. A polarization-maintaining optical fiber is connected to the laser diode, for example. A polarized emission from the laser diode enters the polarization-maintaining optical fiber. The linear polarization is preserved in the polarization-maintaining optical fiber. "Extinction ratio" represents the characteristic of the polarization-maintaining properties of the polarization-maintaining optical fiber. A predetermined value of the extinction ratio must be established in the polarization-maintaining optical fiber. The fluctuation range of the extinction ratio gets wider in proportion to a drift between the polarization plane of an incident light from the laser diode and the birefringent axis of the polarization-maintaining optical fiber. The relative rotation angle must be adjusted between the laser diode and the polarization-maintaining optical fiber for obtaining the predetermined value of the extinction ratio. Moreover, the extinction ratio depends on the stress generated in the polarization-maintaining optical fiber. For example, the expansion and shrinkage or bending, resulting from a change in temperature, of the polarization-maintaining optical fiber induce a change in the extinction ratio. In addition, the extinction ratio must be restricted within a predetermined range. The range of the extinction ratio is determined based on the relative rotation angle between the laser diode and the polarization-maintaining optical fiber. The relative rotation angle is precisely adjusted around an optical axis between the laser diode and the polarization-maintaining optical fiber during the assembling of a laser diode module.

The extinction ratio is measured during the adjustment of the relative rotation angle between the laser diode and the polarization-maintaining optical fiber. As described above, since the extinction ratio depends on the stress generated in the polarization-maintaining optical fiber, a load is applied to the polarization-maintaining optical fiber during the measurement of the extinction ratio. The stress changes in the polarization-maintaining optical fiber based on the magnitude of the load. The change in the stress induces change in the extinction ratio. The extinction ratio is measured at various values of the load for grasping the change in the extinction ratio resulting from the change in the stress. Moreover, since the extinction ratio depends on the relative rotation angle between the laser diode and the polarization-maintaining optical fiber, the measurement of the extinction ratio must be conducted at a plurality of relative rotation angles. The relative rotation angle is forced to shift by 0.1 degrees over a range of 20 degrees around the optical axis between the light source and the polarization-maintaining optical fiber in the measurement of the extinction ratio, for example. Specifically, the extinction ratio must be measured at every 0.1 degree. As a result, much time and labor are required to adjust the polarization-maintaining optical fiber relative to the light source around the optical axis.

SUMMARY OF THE INVENTION

It is accordingly an object of the present invention to provide a method capable of adjusting the relative rotation between a light source and a polarization-maintaining optical fiber in a shorter time period. It is an object of the present invention to provide a method of making an optical module, enabling adjustment of the relative rotation between a light source and a polarization-maintaining optical fiber in a short time period.

According to a first aspect of the present invention, there is provided an optical module comprising: an enclosure; a light source enclosed in the enclosure; and a polarization-maintaining optical fiber coupled to the enclosure in the attitude of a predetermined rotation angle position around the optical axis with respect to the light source, wherein the predetermined rotation angle position is defined based on an intersection point between a first characteristic curve and a second characteristic curve, the first characteristic curve presenting values of extinction ratio for relative rotation angles, respectively, between the light source and the polarization-maintaining optical fiber in a condition where the polarization-maintaining optical fiber exhibits a maximum extinction ratio in response to application of a load when the polarization-maintaining optical fiber takes a specific attitude of a specific rotation angle position around the optical axis, the specific rotation angle position presenting the polarization-maintaining optical fiber exhibiting a maximum extinction ratio with no load applied, And the second characteristic curve presenting values of extinction ratio for relative rotation angles, respectively, between the light source and the polarization-maintaining optical fiber in a condition where the polarization-maintaining optical fiber exhibits a minimum extinction ratio in response to application of a load when the polarization-maintaining optical fiber takes the specific attitude of the specific rotation angle position around the optical axis.

The polarization-maintaining optical fiber is forced to take the attitude of the rotation angle position establishing the maximum extinction ratio in a condition where the polarization-maintaining optical fiber receives no load. Under this situation, the first characteristic curve is derived to present the values of the extinction ratio for various relative rotation angles between the light source and the polarization-maintaining optical fiber establishing the maximum extinction ratio in response to the application of load. The second characteristic curve is likewise derived to present the values of the extinction ratio for various relative rotation angles between the light source and the polarization-maintaining optical fiber establishing the minimum extinction ratio in response to the application of load. The predetermined rotation angle position is thus defined based on the intersection point between the first and second characteristic curves. The extinction ratio needs not be measured for a large number of values of the load. The adjustment of the relative rotation angle can be conducted in a shorter time. Less time is required for the production of the optical module.

According to a second aspect of the present invention, there is provided a method of making an optical module, comprising: rotating a polarization-maintaining optical fiber, with no load applied, around the optical axis relative to a light source enclosed in an enclosure, so as to set the polarization-maintaining optical fiber in the attitude of a specific rotation angle position for establishing the initial maximum extinction ratio; changing a load applied to the polarization-maintaining optical fiber of the attitude so as to find a maximum extinction ratio and a minimum extinction ratio of the polarization-maintaining optical fiber of the attitude; applying the load for establishment of the maximum extinction ratio to the polarization-maintaining optical fiber during a relative rotation between the light source and the polarization-maintaining optical fiber, thereby providing a first characteristic curve presenting values of extinction ratio for relative rotation angles; applying the load for establishment of the minimum extinction ratio to the polarization-maintaining optical fiber during a relative rotation between the light source and the polarization-maintaining optical fiber, thereby providing a second characteristic curve presenting values of extinction ratio for relative rotation angles; establishing a specific relative rotation angle between the light source and the polarization-maintaining optical fiber, the specific relative rotation angle corresponding to the intersection point between the first and second characteristic curves; and fixing the polarization-maintaining optical fiber to the enclosure.

The polarization-maintaining optical fiber is first forced to take the attitude of the rotation angle position establishing the maximum extinction ratio in a condition where the polarization-maintaining optical fiber receives no load. The load is then applied to the polarization-maintaining optical fiber so as to find the maximum and minimum values of the extinction ratio. The load is changed. The first and second characteristic curves are in this manner derived in the same manner as described above. The relative rotation angle corresponding to the intersection point of the first and second characteristic curves is thereafter established between the light source and the polarization-maintaining optical fiber. The extinction ratio needs not be measured for a large number of values of the load. The adjustment of the relative rotation angle can be conducted in a shorter time. Less time is required for the production of the optical module.

According to a third aspect of the present invention, there is provided a method of making an optical module, comprising: rotating an optical fiber relative to a light source so as to measure values of a first extinction ratio for relative rotation angles between the light source and the optical fiber; determining a reference relative rotation angle among the relative rotation angles based on the values of the first extinction ratio, a maximum value of the first extinction ratio being established at the reference relative rotation angle; establishing the maximum relative rotation angle between the light source and the optical fiber; applying a load to the optical fiber so as to measure values of a second extinction ratio for variety of loads; determining a first load and a second load based on the values of the second extinction ratio, the first load corresponding to the maximum value of the second extinction ratio, the second load corresponding to the minimum value of the second extinction ratio; applying the first load to the optical fiber during a relative rotation between the light source and the optical fiber so as to measure values of a third extinction ratio for relative rotation angles; applying the second load to the optical fiber during a relative rotation between the light source and the optical fiber so as to measure values of a fourth extinction ratio for relative rotation angles; determining a specific relative rotation angle establishing the third extinction ratio equal to the fourth extinction ratio; and establishing the specific relative rotation angle between the light source and the optical fiber, for fixing the optical fiber relative to the light source.

The reference relative rotation angle for establishment of the maximum value of the first extinction ratio is established between the light source and the optical fiber. Under this situation, the first load and the second load are determined. The first load serves to establish the maximum value of the second extinction ratio. The second load serves to establish the minimum value of the second extinction ratio. The third extinction ratio is thereafter measured for various relative rotation angles during the application of the first load to the optical fiber. The fourth extinction ratio is thereafter measured for various relative rotation angles during the application of the second load to the optical fiber. A relative rotation angle is determined when the third extinction ratio coincides with the fourth extinction ratio. The extinction ratio needs not be measured for a large number of values of the load. The adjustment of the relative rotation angle can be conducted in a shorter time. Less time is required for the production of the optical module.

According to a fourth aspect of the present invention, there is provided a method of adjusting the rotation angle of an optical fiber, comprising: rotating a polarization-maintaining optical fiber, with no load applied, around the optical axis relative to a light source, so as to set the polarization-maintaining optical fiber in the attitude of a rotation angle position for establishing an initial maximum extinction ratio; changing a load applied to the polarization-maintaining optical fiber of the attitude so as to find a maximum extinction ratio and a minimum extinction ratio of the polarization-maintaining optical fiber of the attitude; applying the load for establishment of the maximum extinction ratio to the polarization-maintaining optical fiber during a relative rotation between the light source and the polarization-maintaining optical fiber, thereby providing a first characteristic curve presenting values of an extinction ratio for relative rotation angles; applying the load for establishment of the minimum extinction ratio to the polarization-maintaining optical fiber during a relative rotation between the light source and the polarization-maintaining optical fiber, thereby providing a second characteristic curve presenting values of an extinction ratio for relative rotation angles; and establishing a relative rotation angle between the light source and the polarization-maintaining optical fiber, the relative rotation angle corresponding to an intersection point between the first and second characteristic curves. This method greatly contributes to realization of the aforementioned method of making an optical module.

According to a fifth aspect of the present invention, there is provided a method of adjusting the rotation angle of an optical fiber, comprising: changing a relative rotation angle between a first optical unit and a second optical unit so as to measure values of a first extinction ratio for relative rotation angles; setting a reference relative rotation angle between the first optical unit and the second optical unit, the reference relative rotation angle being selected from the relative rotation angles for establishment of a maximum value of the first extinction ratio based on the values of the first extinction ratio; changing a load applied to the first optical unit so as to measure values of a second extinction ratio for variety of loads; applying a first load or a second load to the first optical unit based on measured values of the second extinction ratio during a relative rotation between the first optical unit and the second optical unit so as to measure values of an extinction ratio for relative rotation angles, the first load corresponding to a maximum value of the second extinction ratio, the second load corresponding to a minimum value of the second extinction ratio; and setting the first optical unit and the second optical unit at the relative rotation angle corresponding to a third extinction ratio equal to a fourth extinction ration, the third extinction ratio being established in response to application of the first load to the first optical unit, the fourth extinction ratio being established in response to application of the second load to the first optical unit. This method greatly contributes to realization of the aforementioned method of making an optical module.

According to a sixth aspect of the present invention, there is provided an apparatus for adjusting the rotation angle of an optical fiber, comprising: a holding member for holding a polarization-maintaining optical fiber for rotation relative to a light source around the optical axis; a load measuring unit applying a load to the polarization-maintaining optical fiber and measuring the load; an extinction ratio measuring unit connected to the polarization-maintaining optical fiber, the extinction ratio measuring unit designed to measure an extinction ratio of the polarization-maintaining optical fiber; and a controlling circuit connected to the load measuring unit and the extinction ratio measuring unit, the controlling circuit designed to determine a predetermined relative rotation angle between the light source and the polarization-maintaining optical fiber, wherein the predetermined rotation angle position is defined based on an intersection point between a first characteristic curve and a second characteristic curve, the first characteristic curve presenting values of extinction ratio for relative rotation angles, respectively, between the light source and the polarization-maintaining optical fiber in a condition where the polarization-maintaining optical fiber exhibits a maximum extinction ratio in response to application of a load when the polarization-maintaining optical fiber takes a specific attitude of a specific rotation angle position around the optical axis, the specific rotation angle position presenting the polarization-maintaining optical fiber exhibiting a maximum extinction ratio with no load applied, and the second characteristic curve presenting values of extinction ratio for relative rotation angles, respectively, between the light source and the polarization-maintaining optical fiber in a condition where the polarization-maintaining optical fiber exhibits a minimum extinction ratio in response to application of a load when the polarization-maintaining optical fiber takes the specific attitude of the specific rotation angle position around the optical axis. This apparatus greatly contributes to realization of the aforementioned method of making an optical module and the aforementioned method of adjusting the rotation angle.

According to a seventh aspect of the present invention, there is provided a computer-readable storage medium containing program instructions controlling a processor to adjust the rotation angle of an optical fiber, by: outputting a control signal specifying a rotation of a polarization-maintaining optical fiber relative to a light source around an optical axis; determining a reference relative rotation angle between the light source and the polarization-maintaining optical fiber, the reference relative rotation angle representing an initial maximum extinction ratio of the polarization-maintaining optical fiber, with no load applied, in response to an output of the control signal; outputting an alignment signal specifying an attitude of the polarization-maintaining optical fiber around the optical axis based on the reference relative rotation angle; obtaining a maximum extinction ratio of the polarization-maintaining optical fiber in response to a change of the load applied to the polarization-maintaining optical fiber after an output of the alignment signal; obtaining a minimum extinction ratio of the polarization-maintaining optical fiber in response to a change of the load applied to the polarization-maintaining optical fiber after the output of the alignment signal; obtaining a first characteristic curve based on the load for establishment of the maximum extinction ratio, the first characteristic curve presenting a relation between the extinction ratio and a relative rotation angle between the light source and the polarization-maintaining optical fiber; obtaining a second characteristic curve based on the load for establishment of the minimum extinction ratio, the second characteristic curve presenting a relation between the extinction ratio and the relative rotation angle between the light source and the polarization-maintaining optical fiber; and obtaining a specific relative rotation angle corresponding to an intersection point between the first characteristic curve and the second characteristic curve. The program instructions greatly contribute to realization of the aforementioned method of making an optical module and the aforementioned method of adjusting the rotation angle.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
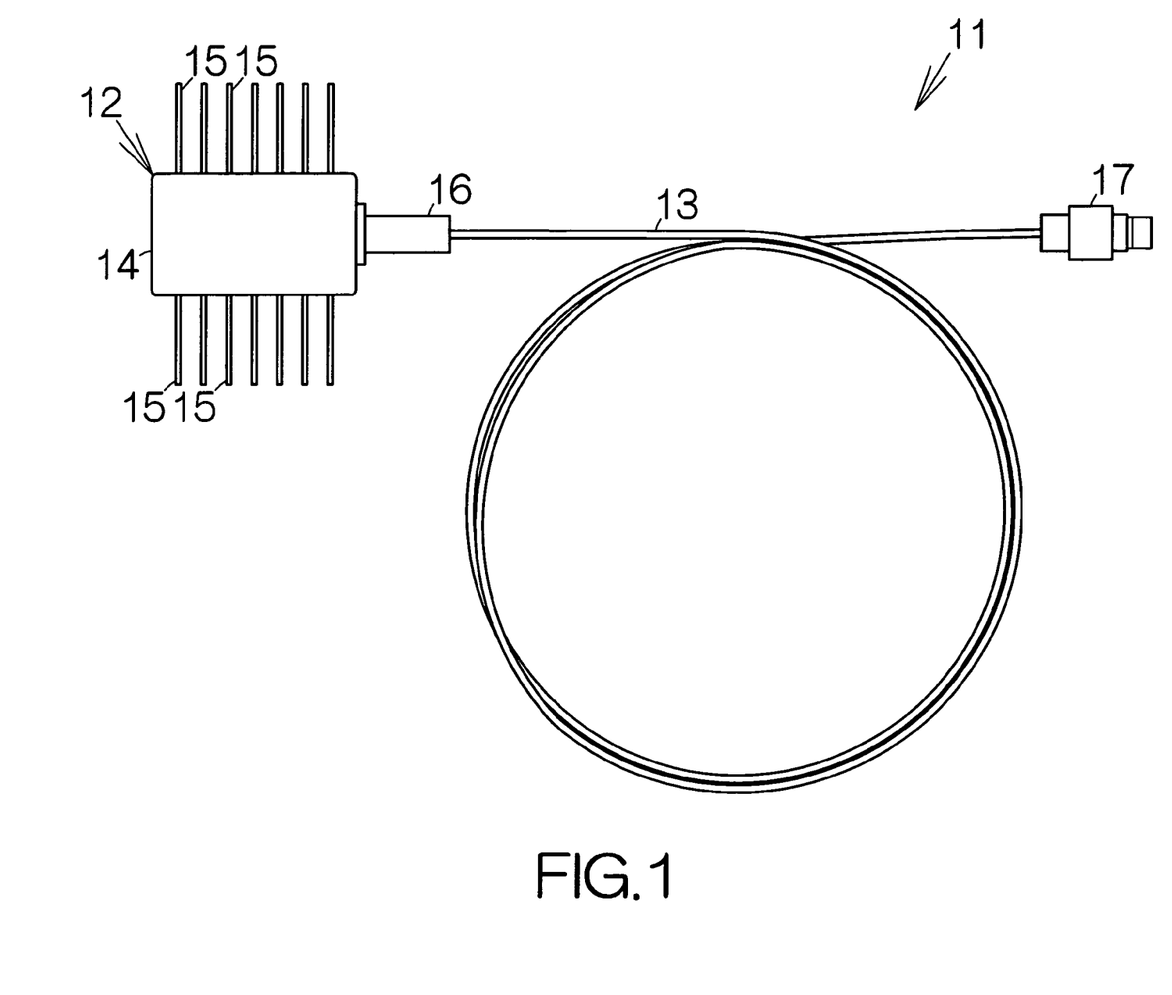
FIG. 1 is a plan view schematically illustrating the structure of a laser diode (LD) module as an example of an optical module according to an embodiment of the present invention.

FIG. 1 is a plan view schematically illustrating the structure of a laser diode module 11 as an example of an optical module according to one embodiment of the present invention. The laser diode module 11 is employed in a dense wavelength division multiplexing, DWDM, communication system, for example. The laser diode module 11 includes a module body 12 and an optical fiber 13. The optical fiber 13 is coupled to the module body 12. The module body 12 includes an enclosure 14. Electrode pins 15 are attached to the enclosure 14. The enclosure 14 is fixed to a printed wiring board, not shown, for example. Screws may be utilized to fix the enclosure 14. The electrode pins 15 are connected to conductive pads on the printed wiring board, for example.

Figure 2:
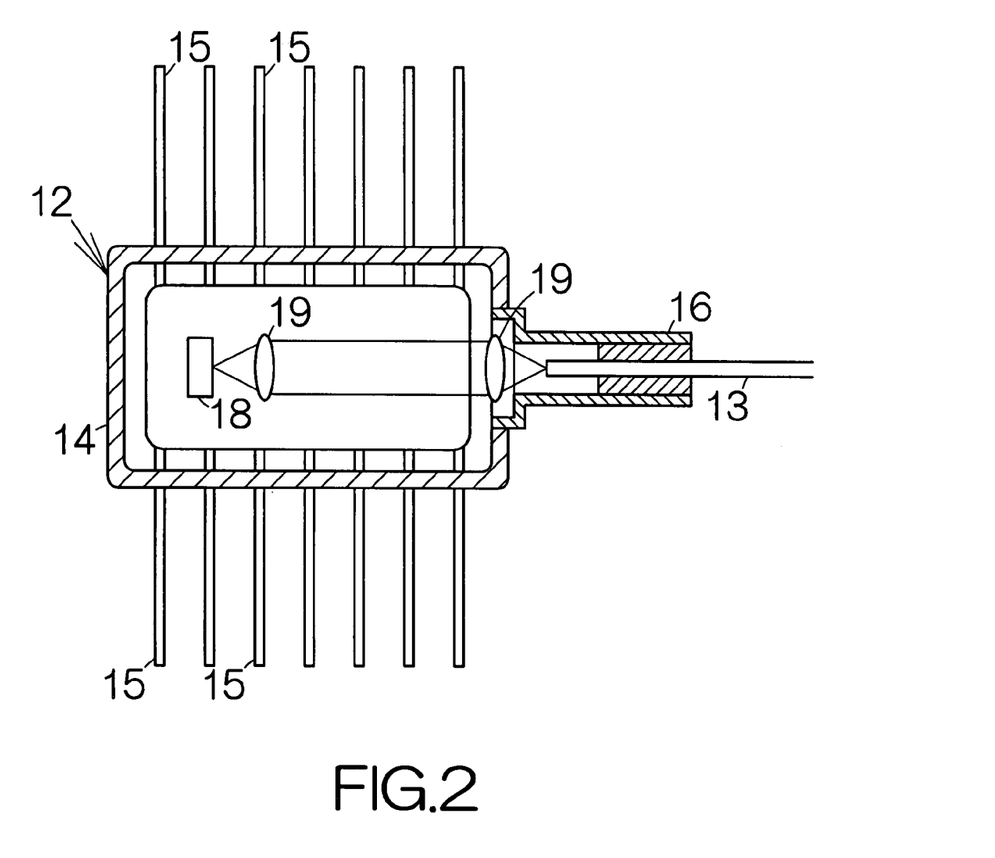
FIG. 2 is a sectional view schematically illustrating the structure of a module body.

The optical fiber 13 is provided with a ferrule 16 at one end thereof. The ferrule 16 is coupled to the enclosure 14. Laser welding is employed for the coupling, for example. A connector 17 is coupled to the other end of the optical fiber 13. The connector 17 is utilized to couple the optical fiber 13 to a relay device, not shown, for establishment of the DMDW communication system, for example. As shown in FIG. 2, the enclosure 14 contains optical components such as a light source, that is, an laser diode 18, aspheric lenses 19, and the like. The laser diode 18 emits light. The aspheric lenses 19 serve to couple the emitted light from the laser diode 18 to the end of the optical fiber 13. As will be described later, the optical fiber 13 is fixed in an attitude of a predetermined rotation angle around the optical axis relative to the laser diode 18. The module body 12 and the optical fiber 13 correspond to either of first and second optical units of the present invention.

Figure 3:
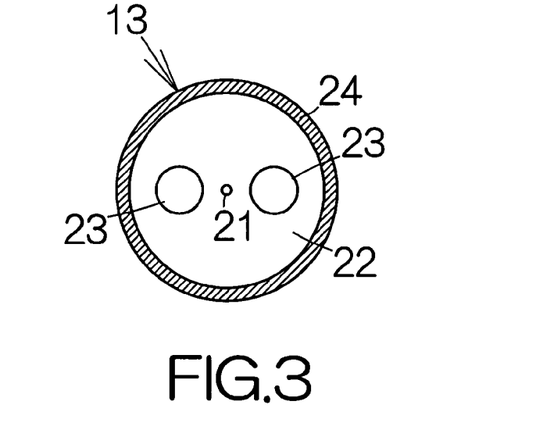
FIG. 3 is a sectional view schematically illustrating the structure of an optical fiber.

A polarization-maintaining optical fiber such as a PANDA optical fiber is employed for the optical fiber 13. As shown in FIG. 3, the optical fiber 13 includes a core 21 and a cladding 22. The cladding 22 envelops the core 21. A pair of stress-applying rods 23 is formed in the cladding 22. The stress-applying rods 23 are arranged at positions spaced from the core 21 in the opposite directions. The stress-applying rods 23 serve to induce stress in the core 21. The stress serves to maintain the polarization plane of a laser beam in the optical fiber 13. The cladding 22 is covered with a protection layer 24 made of resin, for example.

Next, a brief description will be made below on a method of making the laser diode module 11. First of all, a module body 12 is made. An optical fiber 13 is then attached to the module body 12 for relative rotation around the optical axis of a laser diode 18. In this case, the optical axis of the optical fiber 13 is aligned with the optical axes of the laser diode 18 and the aspheric lenses 19. Subsequently, the relative rotation angle is adjusted between the laser diode 18 and the optical fiber 13. The optical fiber 13 is then fixed to the enclosure 14. Laser welding is employed to fix the optical fiber 13. The laser diode module 11 is in this manner produced.

Figure 4:
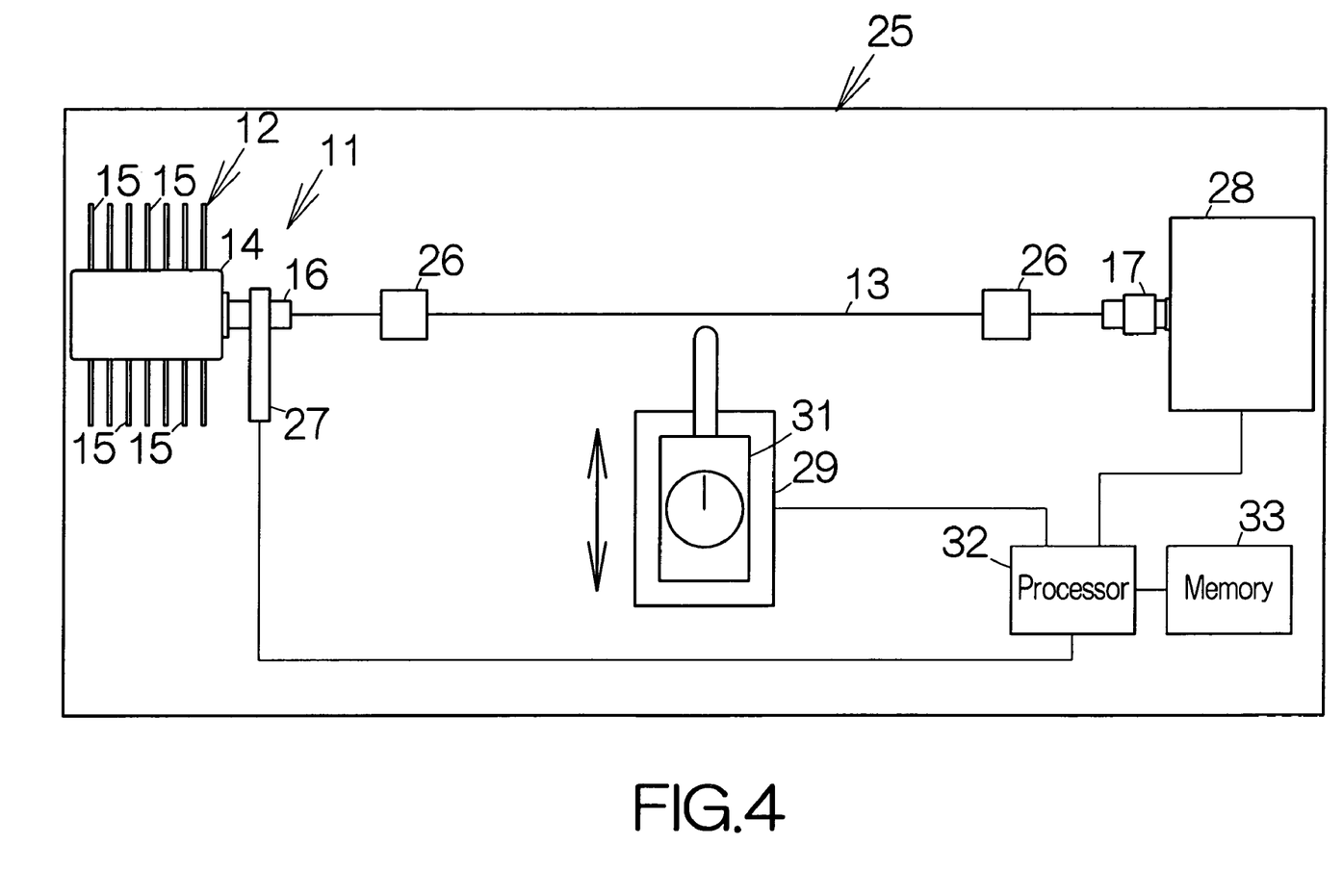
FIG. 4 is a plan view schematically illustrating the optical fiber mounted on an adjustment apparatus.

As shown in FIG. 4, an adjustment apparatus 25 is prepared for the adjustment of the relative rotation angle. The laser diode module 11 is mounted on the adjustment apparatus 25. The module body 12 is immobilized on the adjustment apparatus 25. The optical fiber 13 is held on a pair of fixing members 26, 26 between the ferrule 16 and the connector 17. The interval of 200 mm approximately is established between the fixing members 26, 26, for example. The ferrule 16 of the optical fiber 13 is held on a holding member 27. The holding member 27 is designed to rotate the optical fiber 13 relative to the module body 12 around the aforementioned optical axis, for example, based on the driving force from a motor. The optical fiber 13 is rotated at the angular pitch of 0.1 degree, for example. The connector 17 of the optical fiber 13 is coupled to an extinction ratio measuring device 28. The optical fiber 13 extends straight between the fixing members 26, 26.

Figure 5:
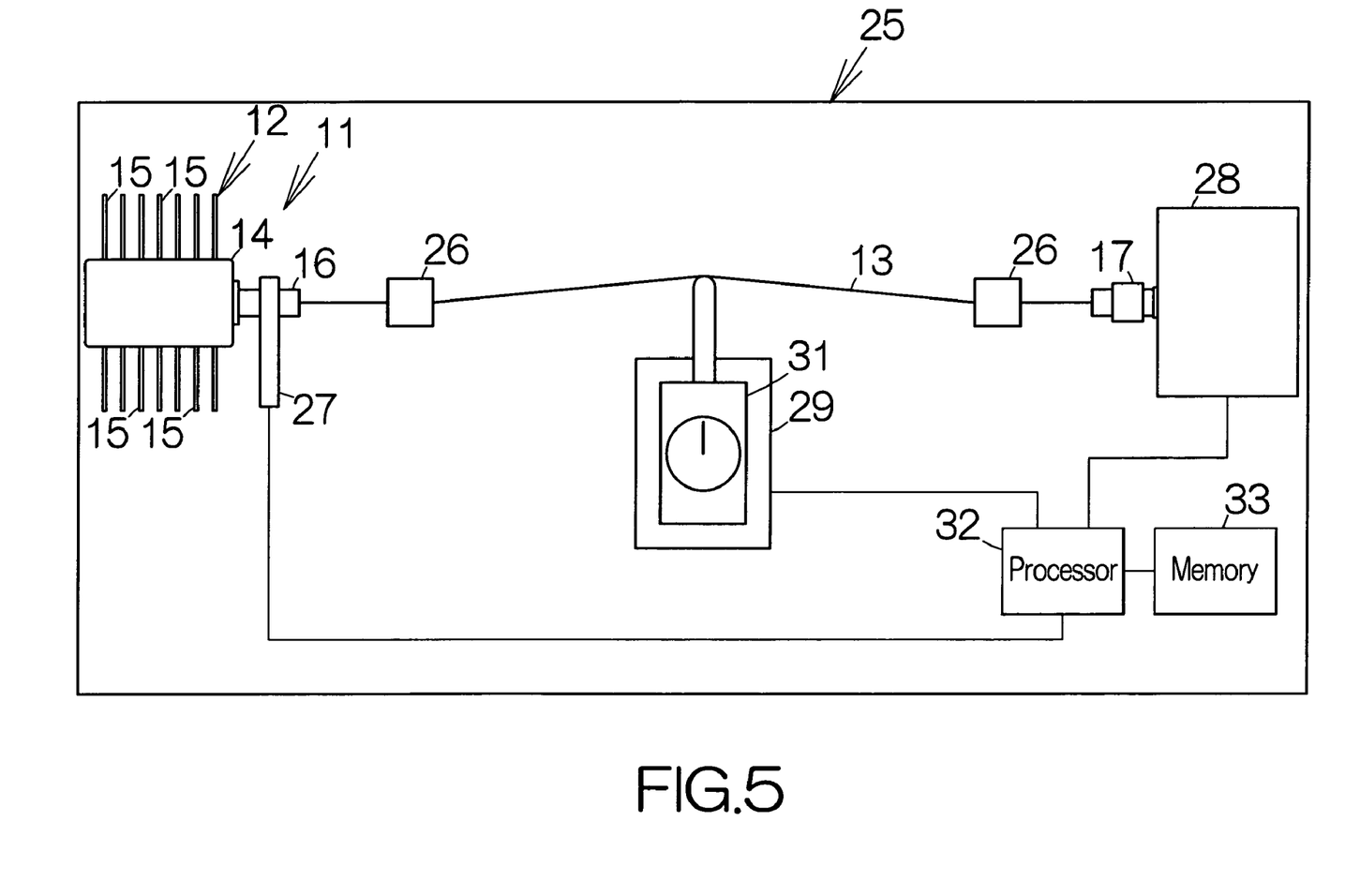
FIG. 5 is a plan view schematically illustrating the optical fiber receiving a load on the adjustment apparatus.

A stage 29 is placed in a space between the fixing members 26, 26. The stage 29 is allowed to move within a plane perpendicular to an imaginary straight line corresponding to the optical fiber 13 between the fixing members 26, 26, as indicated by an arrow in FIG. 4. The stage 29 includes a driving mechanism, not shown, for realization of the movement. A load measuring device, that is, a push-pull gauge 31 is fixed to the stage 29. When the optical fiber 13 is held on the fixing members 26, 26, the end of the push-pull gauge 31 is opposed to the optical fiber 13 between the fixing members 26, 26. The push-pull gauge 31 moves forward to contact the optical fiber 13 between the fixing members 26, as shown in FIG. 5. The forward movement of the stage 29 allows the push-pull gauge 31 to apply a load to the optical fiber 13. The push-pull gauge 31 concurrently measures the load applied to the optical fiber 13.

The adjustment apparatus 25 includes a controlling circuit, that is, a processor 32. The processor 32 supplies a control signal to the holding member 27, the extinction ratio measuring device 28, the stage 29 and the push-pull gauge 31 for the operation of the holding member 27, the extinction ratio measuring device 28, the stage 29 and the push-pull gauge 31. The processor 32 is supplied with a signal specifying the extinction ratio from the extinction ratio measuring device 28 and a signal specifying the load from the push-pull gauge 31. The holding member 27 is designed to establish a specific relative rotation angle between the laser diode 18 and the optical fiber 13 based on an alignment signal supplied from the processor 32. The processor 32 is designed to operate in accordance with control programs stored in a memory 33, for example. The control programs may be installed into the memory 33 from an external storage such as a compact disk, CD, a flexible disk, FD, or the like.

Figure 6:
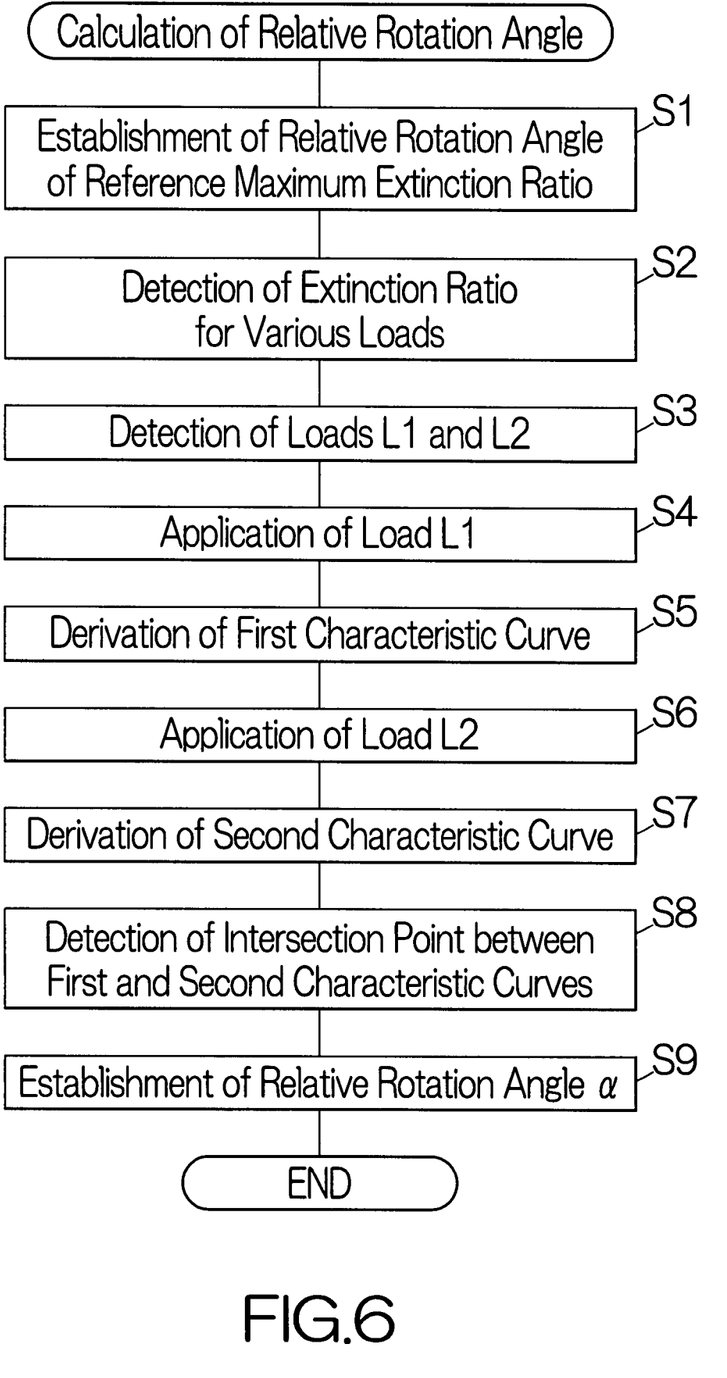
FIG. 6 is a flowchart schematically illustrating the procedures of a processor based on a software program.

FIG. 6 is a flowchart schematically illustrating procedures in the processor 32 based on the control programs. When the control programs are booted up, a specific relative rotation angle is established between the laser diode 18 and the optical fiber 13 for establishment of a reference maximum extinction ratio of the optical fiber 13 at step S1. The processor 32 outputs a control signal to the holding member 27 under the no-load condition where no load is applied to the optical fiber 13. The holding member 27 causes the optical fiber 13 to rotate around the optical axis relative to the module body 12 based on the control signal. The optical fiber 13 is rotated relative to the laser diode 18 by the angular pitch of 0.1 degree, for example. The extinction ratio measuring device 28 detects the extinction ratio of the optical fiber 13 every time the relative rotation angle shifts by 0.1 degree. The measured extinction ratio is stored in the memory 33, for example. The processor 32 detects, based on the extinction ratio measured at the extinction ratio measuring device 28, the relative rotation angle for establishment of the maximum extinction ratio corresponding to the reference maximum extinction ratio. The detected relative rotation angle for establishment of the reference maximum extinction ratio is stored in the memory 33 as a reference angle, that is, "0" degree. The processor 32 is designed to output an alignment signal to the holding member 27 for setting the optical fiber 13 in the attitude of the reference angle around the optical axis. The relative rotation angle is thus established between the laser diode 18 and the optical fiber 13 for establishment of the reference maximum extinction ratio.

Figure 7:
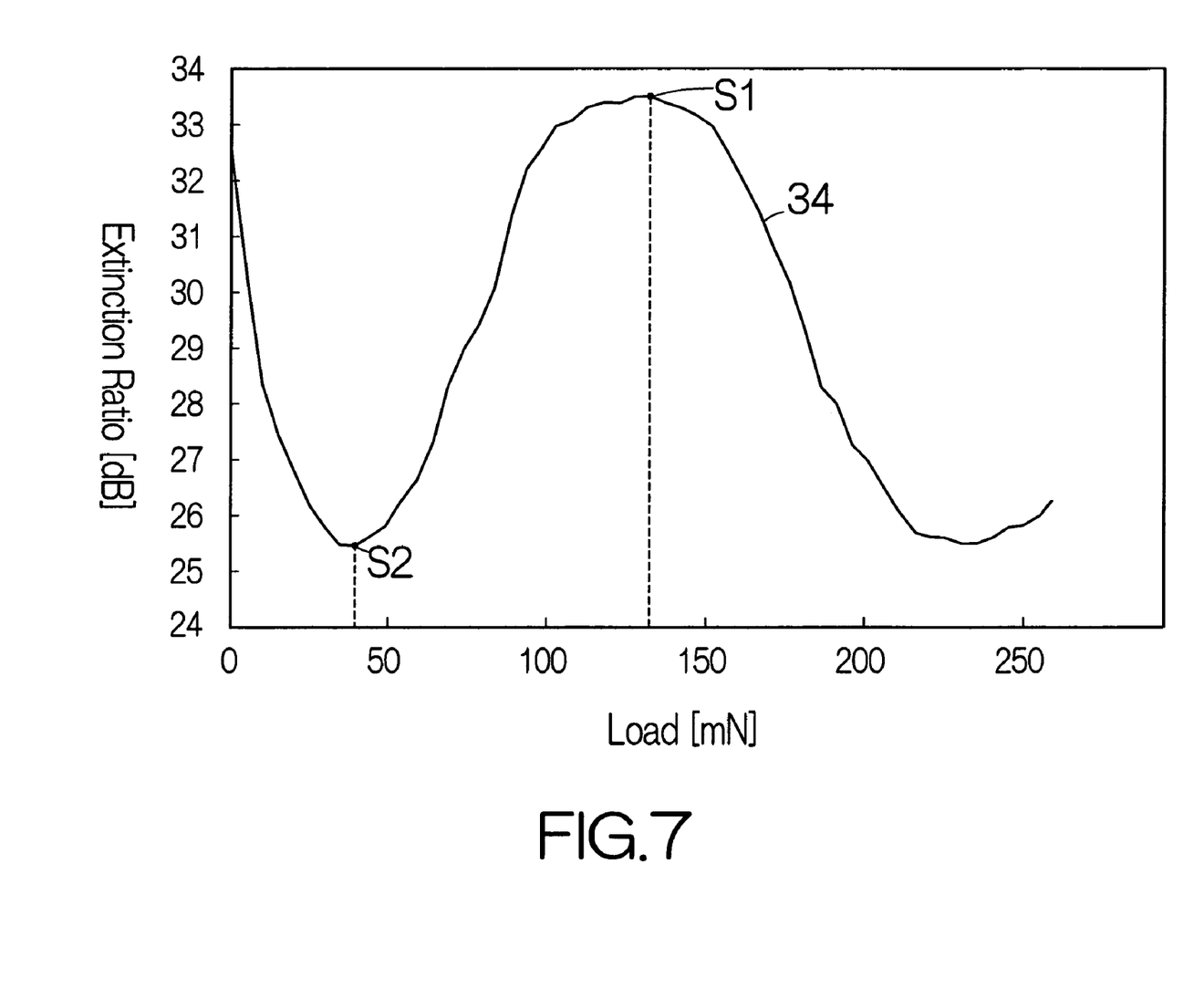
FIG. 7 is a graph showing a characteristic curve presenting the relationship between the load and the extinction ratio.

Subsequently, the stage 29 advances to urge the push-pull gauge 31 against the optical fiber 13 for deformation of the optical fiber 13, while the specific relative rotation angle is maintained. The push-pull gauge 31 thus applies a load to the optical fiber 13. As the stage 29 moves forward, the applied load increases. Stress changes in the optical fiber 13 in response to the increase of the load. The extinction ratio measuring device 27 measures the extinction ratio of the optical fiber 13. The movement of the stage 29 causes a change in the load applied to the optical fiber 13. The processor 32 detects the extinction ratio of the optical fiber 13 for the various loads at step S2. As shown in FIG. 7, the processor 32 thus derives a characteristic curve 34 presenting the relationship between the load and the extinction ratio. The processor 32 is designed to pick up a first load S1 representing the maximum extinction ratio in the characteristic curve 34 at step S3. The processor 32 is likewise designed to pick up a second load S2 representing the minimum extinction ratio in the characteristic curve 34 at step S3.

Figure 8:
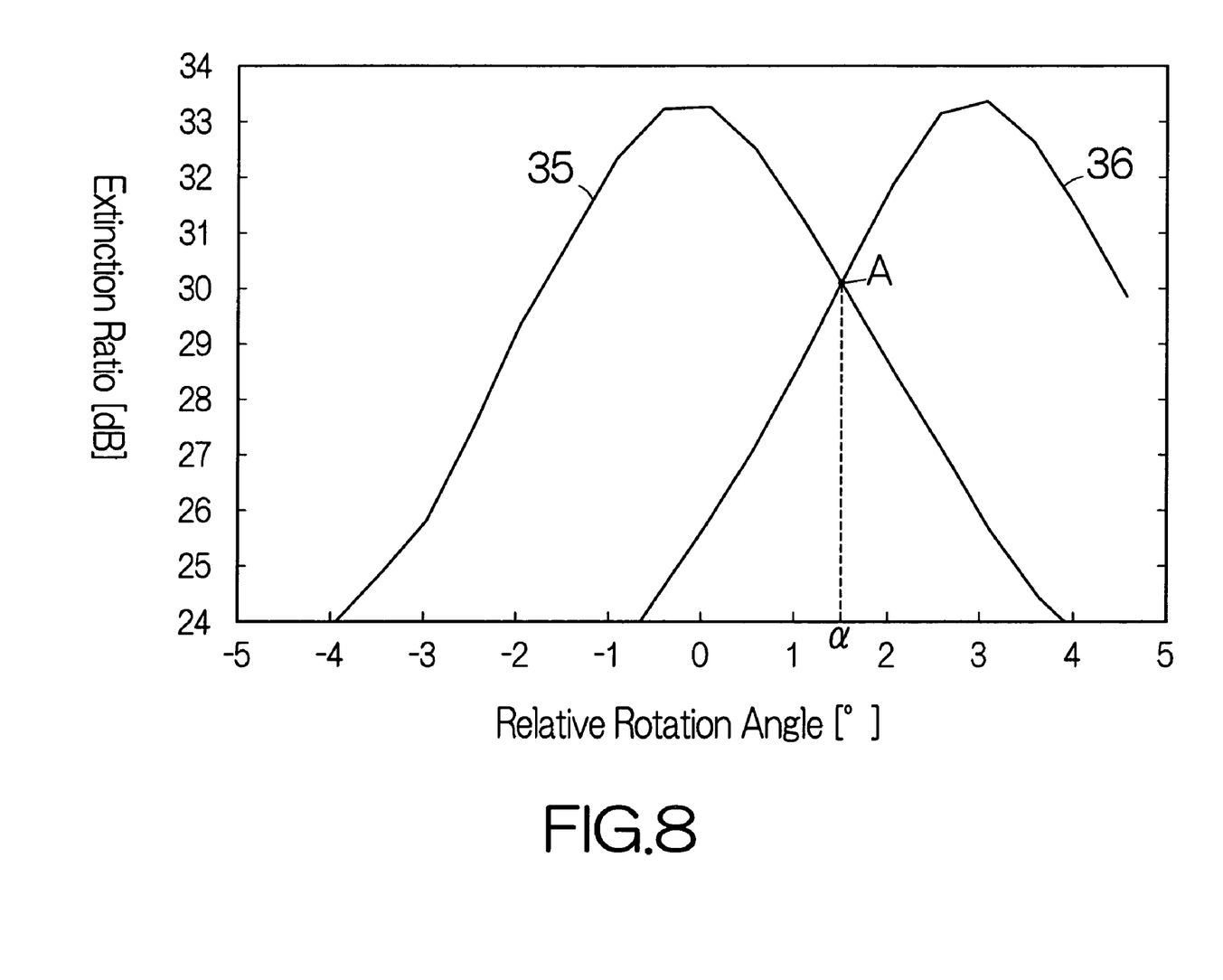
FIG. 8 is a graph showing characteristic curves presenting the relationship between the relative rotation angle and the extinction ratio.

Subsequently, the processor 32 causes the stage 29 to move forward at step S4 of FIG. 6. The forward movement of the stage 29 enables application of the aforementioned first load S1 to the optical fiber 13 from the push-pull gauge 31. The first load S1 is then maintained. The holding member 27 drives the optical fiber 13 for rotation around the optical axis relative to the module body 12 based on the control signal supplied from the processor 32. The optical fiber 13 is rotated relative to the laser diode 18 by the angular pitch of 0.5 degrees, for example. The extinction ratio is measured every time the relative rotation angle shifts by 0.5 degrees. The memory 33 stores the relationship between the relative rotation angle and the extinction ratio. The processor 32 at step S5 of FIG. 6 derives a first characteristic curve 35 presenting values of the extinction ratio for relative rotation angles, as shown in FIG. 8. The first characteristic curve 35 represents the relationship between the extinction ratio and the relative rotation angle between the laser diode 18 and the optical fiber 13 under the condition where the first load S1 is applied to the optical fiber 13.

Subsequently, the processor 32 causes the stage 29 to move backward, for example, at step S6 of FIG. 6. The backward movement of the stage 29 enables application of the aforementioned second load S2 to the optical fiber 13 from the push-pull gauge 31. The second load S2 is then maintained. The holding member 27 drives the optical fiber 13 for rotation around the optical axis relative to the module body 12 based on the control signal supplied from the processor 32. The optical fiber 13 is rotated relative to the laser diode 18 by the angular pitch of 0.5 degrees, for example. The extinction ratio is measured every time the relative rotation angle shifts by 0.5 degrees. The memory 33 stores the relationship between the relative rotation angle and the extinction ratio. The processor 32 at step S7 of FIG. 6 derives a second characteristic curve 36 presenting values of the extinction ratio for relative rotation angles, as shown in FIG. 8. The second characteristic curve 36 represents the relationship between the extinction ratio and the relative rotation angle between the laser diode 18 and the optical fiber 13 under the condition where the second load S2 is applied to the optical fiber 13.

Subsequently, the processor 32 finds an intersection point A between the first characteristic curve 35 and the second characteristic curve 36 at step S8 of FIG. 6. The processor 32 obtains a relative rotation angle $\alpha$ corresponding to the intersection point A. The processor 32 outputs to the holding member 27 an alignment signal specifying the relative rotation angle $\alpha$. The relative rotation angle $\alpha$ is in this manner established between the laser diode 18 and the optical fiber 13 based on the rotation of the optical fiber 13 relative to the laser diode 18 at step S9 of FIG. 6. The optical fiber 13 is thereafter fixed to the unit body 14. Laser welding may be employed, for example. The optical fiber 13 is in this manner fixed in the attitude of a predetermined rotation angle position around the optical axis relative to the laser diode 18.

Figure 9:
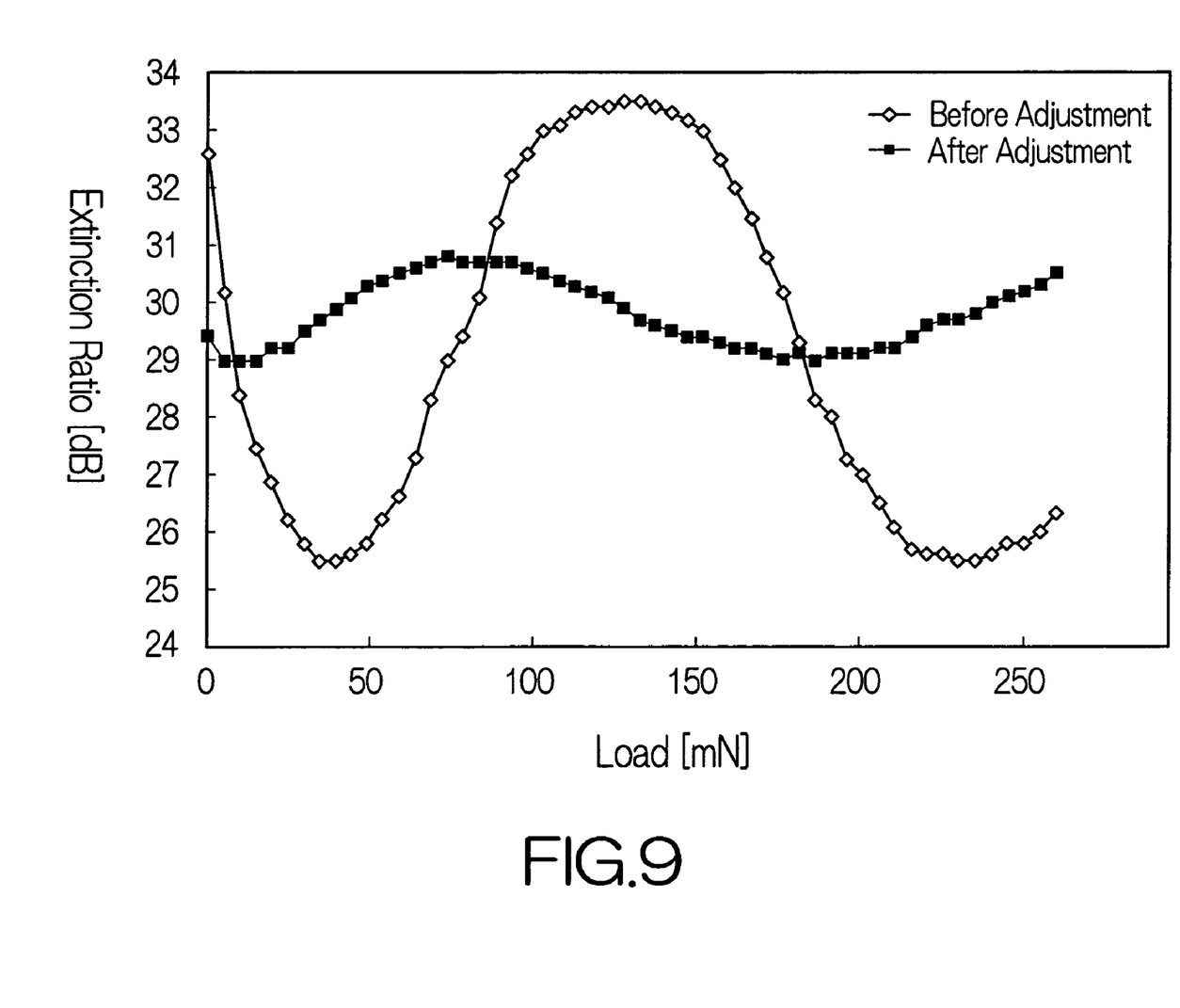
FIG. 9 is a graph showing characteristic curves presenting the relationship between the load and the extinction ratio.

When the relative rotation angle $\alpha$ is established between the laser diode 18 and the optical fiber 13 in the aforementioned method, a fluctuation of the extinction ratio can be suppressed regardless of a change in the load. FIG. 9 is a graph showing the relationship between the load and the extinction ratio before and after the adjustment of the relative rotation angle between laser diode 18 and the optical fiber 13 based on the aforementioned method. As shown in FIG. 9, the laser diode module 11 subjected to the adjustment of the relative rotation angle maintains the extinction ratio larger than a predetermined extinction ratio regardless of a change in the load applied to the optical fiber 13. The predetermined extinction ratio may be set at 28 [dB] which is larger than the predetermined standard value, for example. Moreover, the laser diode module 11 subjected to the adjustment is allowed to enjoy a narrower fluctuation range of the extinction ratio. On the other hand, the laser diode module not subjected to the adjustment suffers from the extinction ratio lower than the predetermined extinction ratio in some range of the load. Moreover, the fluctuation range of the extinction ratio increases extremely.

The method of making as described above enables derivation of the characteristic curve 34 presenting values of the extinction ratio for various loads in the attitude of the relative rotation angle related to the reference maximum extinction ratio. The first characteristic curve 35 is derived for the first load S1 for establishment of the maximum extinction ratio. The second characteristic curve 36 is likewise derived for the second load S2 for establishment of the minimum extinction ratio. As a result, the relative rotation angle $\alpha$ is derived from the intersection point A between the first characteristic curve 35 and the second characteristic curve 36. The extinction ratio needs not be measured for a large number of values of the load in the method of adjusting the relative rotation angle according to the present invention. The adjustment of the relative rotation angle can be conducted in a shorter time period. Less time is required for the production of the laser diode module 11.

Figure 10:
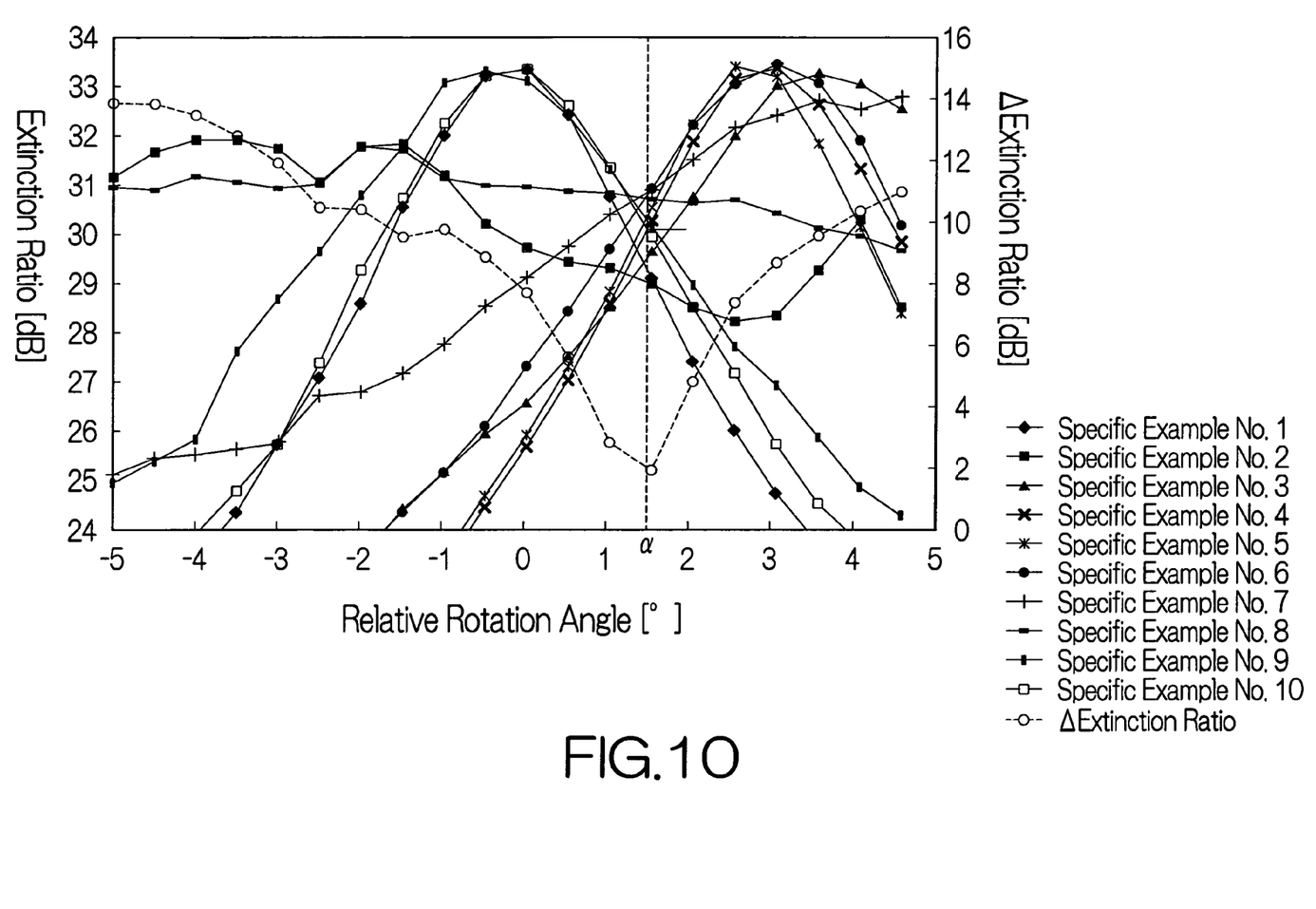
FIG. 10 is a graph showing characteristic curves presenting the relationship between the relative rotation angle and the extinction ratio.

The inventor examined the effects of the method of adjusting the rotation angle according to the present invention. Specific examples No. 1 to No. 10 were prepared for the examination. FIG. 10 is a graph showing the relationship between the relative rotation angle and the extinction ratio in each of the specific examples No. 1 to No. 10. The laser diode module 11 as described above was used in the specific examples No. 1 to No. 10. The laser diode module 11 in each of the specific examples No. 1 to No. 10 was mounted on the adjustment apparatus 25. The value of the load was independently set for the specific examples No. 1 to No. 10. The relative rotation angle was controlled to shift by 0.5 degrees between the laser diode 18 and the optical fiber 13 in the measurement of the extinction ratio. The extinction ratio was measured every time the relative rotation angle shifts by 0.5 degrees. The inventor calculated a delta extinction ratio, namely the difference between the maximum and minimum values of the extinction ratio among the specific examples No. 1 to No. 10 for every 0.5 degrees.

Here, the load was set at zero [mN] for the specific example No. 1. The load was set at 9.8 [mN] in the specific example No. 2. The load was set at 24.5 [mN] for the specific example No. 3. The load was set at 39.2 [mN] for the specific example No. 4. The load was set at 53.9 [mN] for the specific example No. 5. The load was set at 68.6 [mN] for the specific example No. 6. The load was set at 83.3 [mN] for the specific example No. 7. The load was set at 98.0 [mN] for the specific example No. 8. The load was set at 107.8 [mN] for the specific example No. 9. The load was set to 127.4 [mN] for the specific example No. 10. The relative rotation angle was set between the laser diode 18 and the optical fiber 13 in the range between −5.0 degrees and +4.5 degrees from the reference angle in each of the specific examples No. 1 to No. 10.

As shown in FIG. 10, it was confirmed that an extremely small delta extinction ratio appeared at the relative rotation angle $\alpha$ corresponding to the intersection point A. In other words, it was confirmed that the fluctuation range of the extinction ratio becomes extremely smaller regardless of the presence or absence of the load and the degree of the load if the relative rotation angle $\alpha$ is established between the laser diode 18 and optical fiber 13. Specifically, it was confirmed that the optical fiber 13 suffers from less influence of the load in the case where the relative rotation angle α was established between the laser diode 18 and optical fiber 13. It was therefore confirmed that the intersection point A between the first characteristic curve 35 and the second characteristic curve 36 is meaningful for determination of an appropriate relative rotation angle α.

Figure 11:
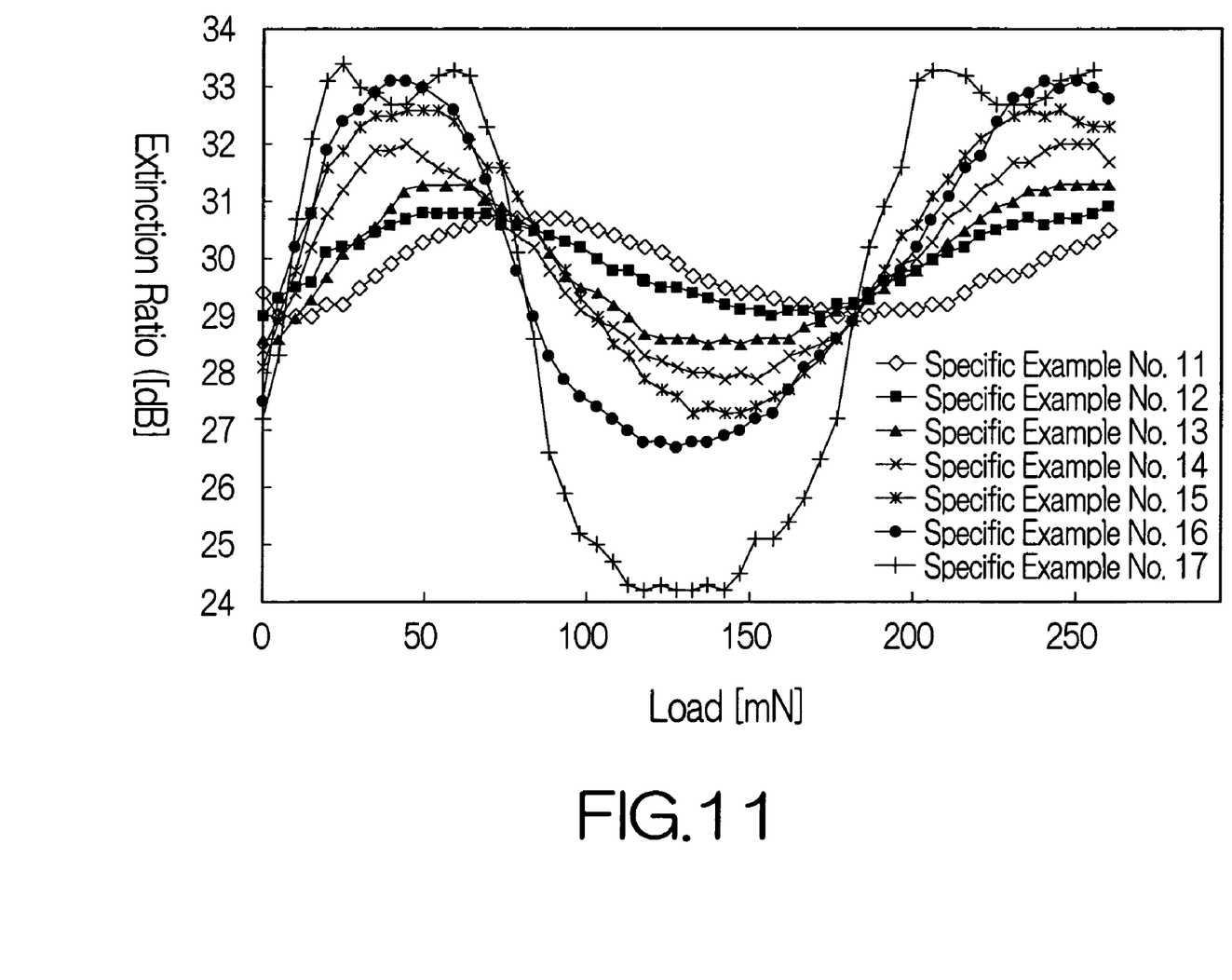
FIG. 11 a graph showing characteristic curves presenting the relationship between the load and the extinction ratio.

The inventor further examined the effects of the method of adjusting the rotation angle according to the present invention. Specific examples No. 11 to No. 17 were prepared for the examination. FIG. 11 is a graph showing the relationship between the relative rotation angle and the extinction ratio in each of the specific examples No. 11 to No. 17. The laser diode module 11 as described above was used in the specific examples No. 11 to No. 17. The aforementioned relative rotation angle α was established in the specific example No. 11. The relative rotation angle was set at an angle deviating from the aforementioned relative rotation angle α in each of the specific examples No. 12 to No. 17. The laser diode module 11 in each of the specific examples No. 11 to No. 17 was mounted on the adjustment apparatus 25. The load of various values was applied to the optical fiber 13 in the specific examples No. 11 to No. 17. The extinction ratio was measured for the values of the load.

Here, the relative rotation angle was set at the aforementioned relative rotation angle α in the specific example No. 11. The relative rotation angle was set at the degree deviating from the relative rotation angle α by 0.2 degrees in the specific example No. 12. The relative rotation angle was set at the degree deviating from the relative rotation angle α by 0.4 degrees in the specific example No. 13. The relative rotation angle was set at the degree deviating from the relative rotation angle α by 0.6 degrees in the specific example No. 14. The relative rotation angle was set at the degree deviating from the relative rotation angle α by 0.8 degrees in the specific example No. 15. The relative rotation angle was set at the degree deviating from the relative rotation angle α by 1.0 degree in the specific example No. 16. The relative rotation angle was set at the degree deviating from the relative rotation angle α by 2.0 degrees in the specific example No. 17. In each of the specific examples No. 11 to No. 17, the load applied to the optical fiber 13 was set in the range from 0 [mN] to 250 [mN].

As shown in FIG. 11, it was confirmed that the fluctuation range of the extinction ratio increases as the deviation from the relative rotation angle α increases. It has been revealed that the relative rotation angle α is allowed to enjoy the narrowest fluctuation range of the extinction ratio as is apparent from the specific example No. 11. It was also confirmed that the extinction ratio was kept equal to or higher than the predetermined value at the relative rotation angle α regardless of the change in the load. It was therefore confirmed that the intersection point A between the first characteristic curve 35 and the second characteristic curve 36 is meaningful for determination of an appropriate relative rotation angle α in the same manner as described above.

It is to be noted that the optical module of the present invention is not limited to the laser diode module 11. The present invention can be applied to other types of products or components requiring adjustment of the extinction ratio in addition to the laser diode module 11.

What is claimed is:

1. An optical module comprising:
an enclosure;
a light source enclosed in the enclosure; and
a polarization-maintaining optical fiber coupled to the enclosure in an attitude of a predetermined rotation angle position around an optical axis with respect to the light source, wherein
the predetermined rotation angle position is defined based on an intersection point between a first characteristic curve and a second characteristic curve,
the first characteristic curve presenting values of extinction ratio for relative rotation angles, respectively, between the light source and the polarization-maintaining optical fiber in a condition where the polarization-maintaining optical fiber exhibits a maximum extinction ratio in response to application of a load when the polarization-maintaining optical fiber takes a specific attitude of a specific rotation angle position around the optical axis, the specific rotation angle position presenting the polarization-maintaining optical fiber exhibiting a maximum extinction ratio with no load applied, and
the second characteristic curve presenting values of extinction ratio for relative rotation angles, respectively, between the light source and the polarization-maintaining optical fiber in a condition where the polarization-maintaining optical fiber exhibits a minimum extinction ratio in response to application of a load when the polarization-maintaining optical fiber takes the specific attitude of the specific rotation angle position around the optical axis.

2. A method of making an optical module, comprising:
rotating a polarization-maintaining optical fiber, with no load applied, around an optical axis relative to a light source enclosed in an enclosure, so as to set the polarization-maintaining optical fiber in an attitude of a specific rotation angle position for establishing an initial maximum extinction ratio;
changing a load applied to the polarization-maintaining optical fiber of the attitude so as to find a maximum extinction ratio and a minimum extinction ratio of the polarization-maintaining optical fiber of the attitude;
applying the load for establishment of the maximum extinction ratio to the polarization-maintaining optical fiber during a relative rotation between the light source and the polarization-maintaining optical fiber, thereby providing a first characteristic curve presenting values of extinction ratio for relative rotation angles;
applying the load for establishment of the minimum extinction ratio to the polarization-maintaining optical fiber during a relative rotation between the light source and the polarization-maintaining optical fiber, thereby providing a second characteristic curve presenting values of extinction ratio for relative rotation angles;
establishing a specific relative rotation angle between the light source and the polarization-maintaining optical fiber, the specific relative rotation angle corresponding to an intersection point between the first and second characteristic curves; and
fixing the polarization-maintaining optical fiber to the enclosure.

3. A method of making an optical module, comprising:
rotating an optical fiber relative to a light source so as to measure values of a first extinction ratio for relative rotation angles between the light source and the optical fiber;
determining a reference relative rotation angle among the relative rotation angles based on the values of the first extinction ratio, a maximum value of the first extinction ratio being established at the reference relative rotation angle;

establishing the maximum relative rotation angle between the light source and the optical fiber;

applying a load to the optical fiber so as to measure values of a second extinction ratio for variety of loads;

determining a first load and a second load based on the values of the second extinction ratio, the first load corresponding to a maximum value of the second extinction ratio, the second load corresponding to a minimum value of the second extinction ratio;

applying the first load to the optical fiber during a relative rotation between the light source and the optical fiber so as to measure values of a third extinction ratio for relative rotation angles;

applying the second load to the optical fiber during a relative rotation between the light source and the optical fiber so as to measure values of a fourth extinction ratio for relative rotation angles;

determining a specific relative rotation angle establishing the third extinction ratio equal to the fourth extinction ratio; and establishing the specific relative rotation angle between the light source and the optical fiber, for fixing the optical fiber relative to the light source.

4. A method of adjusting rotation angle of an optical fiber, comprising:

rotating a polarization-maintaining optical fiber, with no load applied, around an optical axis relative to a light source, so as to set the polarization-maintaining optical fiber in an attitude of a rotation angle position for establishing an initial maximum extinction ratio;

changing a load applied to the polarization-maintaining optical fiber of the attitude so as to find a maximum extinction ratio and a minimum extinction ratio of the polarization-maintaining optical fiber of the attitude;

applying the load for establishment of the maximum extinction ratio to the polarization-maintaining optical fiber during a relative rotation between the light source and the polarization-maintaining optical fiber, thereby providing a first characteristic curve presenting values of an extinction ratio for relative rotation angles;

applying the load for establishment of the minimum extinction ratio to the polarization-maintaining optical fiber during a relative rotation between the light source and the polarization-maintaining optical fiber, thereby providing a second characteristic curve presenting values of an extinction ratio for relative rotation angles; and establishing a relative rotation angle between the light source and the polarization-maintaining optical fiber, the relative rotation angle corresponding to an intersection point between the first and second characteristic curves.

5. A method of adjusting rotation angle of an optical fiber, comprising:

changing a relative rotation angle between a first optical unit and a second optical unit so as to measure values of a first extinction ratio for relative rotation angles;

setting a reference relative rotation angle between the first optical unit and the second optical unit, the reference relative rotation angle being selected from the relative rotation angles for establishment of a maximum value of the first extinction ratio based on the values of the first extinction ratio;

changing a load applied to the first optical unit so as to measure values of a second extinction ratio for variety of loads;

applying a first load or a second load to the first optical unit based on measured values of the second extinction ratio during a relative rotation between the first optical unit and the second optical unit so as to measure values of an extinction ratio for relative rotation angles, the first load corresponding to a maximum value of the second extinction ratio, the second load corresponding to a minimum value of the second extinction ratio; and setting the first optical unit and the second optical unit at the relative rotation angle corresponding to a third extinction ratio equal to a fourth extinction ration, the third extinction ratio being established in response to application of the first load to the first optical unit, the fourth extinction ratio being established in response to application of the second load to the first optical unit.

6. An apparatus for adjusting rotation angle of an optical unit, comprising:

a holding member for holding a polarization-maintaining optical fiber for rotation relative to a light source around an optical axis;

a load measuring unit applying a load to the polarization-maintaining optical fiber and measuring the load;

an extinction ratio measuring unit connected to the polarization-maintaining optical fiber, the extinction ratio measuring unit designed to measure an extinction ratio of the polarization-maintaining optical fiber; and a controlling circuit connected to the load measuring unit and the extinction ratio measuring unit, the controlling circuit designed to determine a predetermined relative rotation angle between the light source and the polarization-maintaining optical fiber, wherein the predetermined rotation angle position is defined based on an intersection point between a first characteristic curve and a second characteristic curve, the first characteristic curve presenting values of extinction ratio for relative rotation angles, respectively, between the light source and the polarization-maintaining optical fiber in a condition where the polarization-maintaining optical fiber exhibits a maximum extinction ratio in response to application of a load when the polarization-maintaining optical fiber takes a specific attitude of a specific rotation angle position around the optical axis, the specific rotation angle position presenting the polarization-maintaining optical fiber exhibiting a maximum extinction ratio with no load applied, and the second characteristic curve presenting values of extinction ratio for relative rotation angles, respectively, between the light source and the polarization-maintaining optical fiber in a condition where the polarization-maintaining optical fiber exhibits a minimum extinction ratio in response to application of a load when the polarization-maintaining optical fiber takes the specific attitude of the specific rotation angle position around the optical axis.

7. A computer-readable storage medium containing program instructions controlling a processor to adjust rotation angle of an optical fiber, by:

outputting a control signal specifying a rotation of a polarization-maintaining optical fiber relative to a light source around an optical axis;

determining a reference relative rotation angle between the light source and the polarization-maintaining optical fiber, the reference relative rotation angle representing an initial maximum extinction ratio of the polarization-maintaining optical fiber, with no load applied, in response to an output of the control signal;

outputting an alignment signal specifying an attitude of the polarization-maintaining optical fiber around the optical axis based on the reference relative rotation angle;

obtaining a maximum extinction ratio of the polarization-maintaining optical fiber in response to a change of the load applied to the polarization-maintaining optical fiber after an output of the alignment signal;

obtaining a minimum extinction ratio of the polarization-maintaining optical fiber in response to a change of the load applied to the polarization-maintaining optical fiber after the output of the alignment signal;

obtaining a first characteristic curve based on the load for establishment of the maximum extinction ratio, the first characteristic curve presenting a relation between the extinction ratio and a relative rotation angle between the light source and the polarization-maintaining optical fiber;

obtaining a second characteristic curve based on the load for establishment of the minimum extinction ratio, the second characteristic curve presenting a relation between the extinction ratio and the relative rotation angle between the light source and the polarization-maintaining optical fiber; and obtaining a specific relative rotation angle corresponding to an intersection point between the first characteristic curve and the second characteristic curve.

* * * * *